United States Patent [19]

Strojny

[11] 3,796,995
[45] Mar. 12, 1974

[54] REMOTE CODED DUAL STATE CONTROLLER APPARATUS

[75] Inventor: Lawrence J. Strojny, West Allis, Wis.

[73] Assignee: Johnson Service Company, Milwaukee, Wis.

[22] Filed: Dec. 15, 1972

[21] Appl. No.: 315,447

[52] U.S. Cl.............................. 340/163, 178/4.1 R
[51] Int. Cl.......................... H04l 11/15, H04q 9/14
[58] Field of Search............ 178/2 R, 2 D, 3, 4.1 R, 178/4.1 B, 4.1 C; 340/147 CV, 147 MD, 147 PC, 163; 318/569, 600, 601

[56] References Cited
UNITED STATES PATENTS

| | | | |
|---|---|---|---|
| 3,456,240 | 7/1969 | Hays | 178/3 |
| 3,531,772 | 9/1970 | Dalyai et al. | 178/4.1 B |
| 3,564,499 | 2/1971 | Ryan | 178/3 |
| 3,593,293 | 7/1971 | Rorholt | 178/4.1 R |
| 3,717,723 | 2/1973 | Jaskulke et al. | 178/3 |
| 3,588,320 | 6/1971 | Guzak, Jr. | 178/2 R |

*Primary Examiner*—Thomas A. Robinson
*Attorney, Agent, or Firm*—Andrus, Sceales, Starke & Sawall

[57] ABSTRACT

A remote station for a loop communication system includes a point module which is specifically related to an on-off load control or the like. The point module is coupled to the loop system through frame handling logic means in common with other similar or different point modules by a common input bus means, with a unique binary address. An address decoder actuates a latch to produce an enable signal which activates a command latch and decoding circuit. A binary command is received from the message frame and is placed in registers. A command control available signal generated by the frame handling logic unit conjointly with the enable sets the register and command signal decoder and establishes a corresponding unique output at a start line, a stop line, status read line and an initialize line. A load select and drive circuit receives coded information which is transferred as a result of a data available signal in combination with the enable means and an initiate signal of the command circuit means to transmit the command signal to one or more loads. The select circuit includes a delayed pulse signal to actuate a circuit isolating a relay unit to separate the digital logic circuitry from the load operating circuits. The load operating status is monitored by detecting of the last actuated contact status and selectively fed back into the loop for transmittal to the loop controller by generating of a request for a message frame. The command signal would be such as to enable the read signal line rather than a start-stop line and provide for transfer of the status information.

20 Claims, 2 Drawing Figures

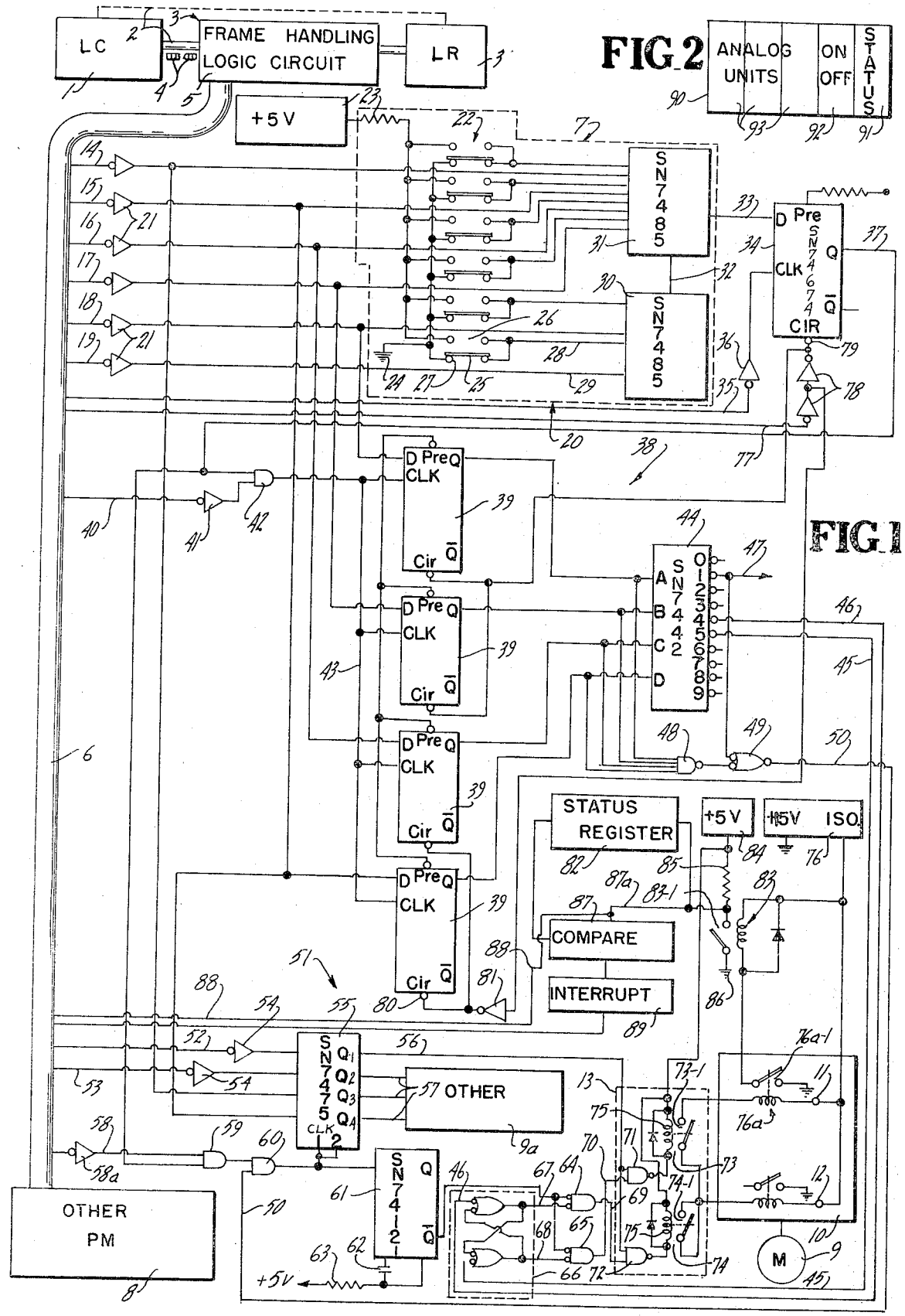

REMOTE CODED DUAL STATE CONTROLLER APPARATUS

BACKGROUND OF THE INVENTION

This invention relates to a coded remote equipment controller apparatus for starting and stopping of equipment from a remote station with means for detecting the status of the equipment.

Automated control systems have been developed for controlling of hardware which is located remotely from a central control station or location. Such control systems may employ direct wired control cables or coded cables to permit selective interconnection of the remote equipment to a central station for control. In such systems it is highly desirable to minimize the required wiring. Thus, in environmental control systems, for example, a central controller may be employed to operate heating, ventilating and air conditioning equipment distributed throughout a building or a building complex. A particularly satisfactory computerized control system is disclosed in the copending application of Buchanan et al. entitled "DATA COMMUNICATION SYSTEM EMPLOYING A SERIES LOOP" Ser. No. 315,567, which was filed on the same day as this application and which is assigned to the same assignee. As more fully disclosed therein, a plurality of remote stations each includes controlled and controlling devices. The remote stations are connected to a central controller by serial communication cable with communication established by continuously generating time spaced multiple bit message frames which are selectively transmitted and received from the remote stations by the controller. The loop controller includes a stored program computer to permit the desired complex control of the equipment. In environmental control systems, motor and similar on-off or dual state devices may be provided at one or more of the remote stations. The system should provide for automatic remote control of the starting and stopping of such equipment and also maintain a continuous monitoring of any change in the status of such equipment between the starting and stopping condition with such information supplied to the central controller for necessary processing.

In order to provide maximum efficiency at any given remote station, it is also desirable to employ a single address for one or more interconnected motors and similar dual operating state devices and employ this address not only to control the starting and stopping but to also detect and provide signalling of the status information.

SUMMARY OF THE PRESENT INVENTION

The present invention is particularly directed to an equipment controller for location at a remote station of a loop system, with means for controlling one or more motors, or other pieces of hardware grouped so as to respond to a common address for both controlling the condition of the hardware and sensing the status. Generally, in accordance with the present invention, the remote station includes a point module which is specifically related to the dual state control of equipment. The point module is coupled to the loop system through frame handling logic means is common with other similar or different point modules by a common input bus means. The point modules are connected to common code logic lines of the bus means for addressing of the point module and providing for communication therewith. Thus, each point module has a unique binary address for that particular station. When an input is received on the common bus lines corresponding to that address in combination with a master control signal generated by the frame handling logic means that a point module address is available, an enable signal actuates a suitable latch circuit which activates the point module and permits the remainder of the data in the message frame to be transmitted into and coupled to the related point module. In particular, the enable signal enables a command latch means which is also coupled into the common bus lines. The message frame then introduces a binary code command which is applied to the command circuit means which includes register means, under the control of the enable signal and also a command control available signal generated by the frame handling logic unit. The command signal is decoded and establishes a corresponding unique output at a start line, a stop line and a status read line. The point module is now activated further and information may be fed from the frame to any one of a plurality of pieces of equipment. The command register means is simultaneously coupled to a plurality of similar select drive circuit means. Additional information is now received from the message frame and applied to select and drive circuit means. The necessary frame activates one or more of the input lines and frame handling logic means generates a data available signal to the select circuit means which, in combination with the enable means and the main control or initiate signal of the command circuit means, transmit the command signal. The select circuit means preferably includes a delayed pulse signal interconnected through to a switching means such as a relay unit to start or stop the hardware such as the motor. The pulse delay maintains the logic circuit in operation for a sufficiently long period to permit the completion of the switching means into a latched condition. A relay unit or similar means is employed with isolated voltage supplies to separate and protect the digital logic circuitry from the hardware operating circuits. For example, switching and operation of a motor field circuit creates electrical disturbances which can damage the logic circuit elements.

The operating status can also be continuously monitored by detecting of the contact status of the motor. This information can be fed back into the loop for transmittal to the loop controller by generating of a request for a message frame. The controller then instructs the remote station to read the status and transmit the status condition to the loop controller. In this instance the command signal would be such as to enable a read signal line rather than a start-stop line and provide for transfer of the status information. In accordance with this concept a single address is employed for the several pieces of equipment and provided with additional logic signalling and decoding to permit the continuous controlling and monitoring of each piece of equipment. Further, as each select circuit is similarly coupled into the message frame and each load select circuit is provided with a unique binary bit location the system permits simultaneous or sequential operation of a plurality of pieces of equipment. Thus it is possible to control the starting or stopping of the equipment and also provide for the necessary common detection of all pieces of equipment. This, in combination with the ability of automatically responding to and enunciating or transmitting a status change maintains a continuous control and monitoring of each of the pieces of equipment with a high degree of efficiency and utilization of space, power and remote station hardware.

In the construction of the remote station of the type employing point modules, printed circuit boards have been employed for each separate functional group to simplify the servicing and maintenance procedures. For example, a single circuit board may be employed to provide circuit connection to a plurality of similar pieces of equipment such as motors. Alternatively, increased efficiency can be obtained by employing a limited number of combined circuit boards and in particular a single board having a plurality of inputs for selectively providing analog select input, a start-stop with contact sense input and a binary contact status sensing input. The individual circuits are provided upon the circuit board with a common addressing means, with a suitable logic control circuitry providing for the selective transfer of information. The circuit board would permit the interconnection of the corresponding analog transmitter with the unique analog code and range information wired between selected connector means and the remainder of the circuitry hard soldered to the boards.

The present invention provides an efficient and simple control module construction for remote coded station means.

BRIEF DESCRIPTION OF DRAWING

The drawing furnished herewith illustrates a preferred construction of the present invention in which the above advantages and features are clearly disclosed as well as others which will be readily understood from the description of such illustrated embodiment.

In the drawing:

FIG. 1 is a schematic illustration of a motor controller coupled as a module in a remote station forming a part of a serial communication loop system; and FIG. 2 is a diagrammatic block illustration of a multiple function point module board which could incorporate the schematically illustrated circuitry of FIG. 1 besides other related circuitry for other equipment at the particular module.

DESCRIPTION OF THE ILLUSTRATED EMBODIMENT

Referring to the drawing, a motor control system is illustrated forming a part of a communication loop system such as shown in the previously referred to copending application of Buchanan et al. Generally, the loop system includes a centrally located loop controller 1 connected by a communication cable 2 to a plurality of remote stations 3 and such other stations as desired or required within the capability of this system. The controller 1 is a stored program computer adapted to transmit and receive information with verification and interpretation of the information to permit a desired control of remote equipment such as in a heating, ventilating and air condition system. Each of the remote stations is generally similarly constructed to provide for interchange of information via cable 2 with the controller and one station 3 as described in detail to clearly explain a preferred construction of the present invention.

The remote station 3, as more fully developed in the Buchanan et al application, includes a frame handling logic circuit 5 which has an input cable connection and an output cable connection to receive and retransmit a series of time spaced multiple binary bit message frames 4 in a serial manner and with each bit in the frame being analyzed and retransmitted, modified or unmodified depending upon the instructions from the loop controller and/or interrelated instructions from equipment or apparatus at the point module at the remote station. Thus the frame handling logic circuit 5 includes a remote station address decoder means which detects whether or not a message frame has been assigned to such remote station 3, or is available for receiving information from such station 3. If communication is to be provided at station 3, the message frame is coupled to a common bus cable 6 which is connected to a plurality of point modules 7 and 8, only two of which are shown. Each of the point modules 7 and 8 generally provide for coupling to peripheral hardware which is functionally interrelated such that a family of point module circuit boards can be provided for coupling of various input-output devices to the remote station frame handling logic unit 5.

The present invention is particularly directed to a point module 7 which can be provided at any remote station for the selective control and monitoring of equipment which has two distinct operating states and in which it is desirable not only to control the equipment but to monitor the status thereof. The necessary circuit is shown schematically at the first station 3 in order to clearly describe the present invention.

The point module 7 is particularly schematically shown to illustrate the dual state control and status sensing of an electrical motor 9, and three other pieces of dual state devices 9a.

In the illustrated embodiment of the invention, the motor 9 is activated from a motor control unit 10 having a start input terminal 11 and a stop input terminal 12. Power is supplied to the motor control circuit and particularly terminals 11 and 12 through a power supply isolating relay unit 13, which is in turn controlled by the information carried in a message frame 4 to maintain complete isolation between the logic circuitry and the circuit of the controlled equipment.

The point module 7 is provided with a unique multiple bit binary address. The cable 6 includes a plurality of common input bus lines and also common output bus lines, as more fully specifically referred to hereinafter. In a practical application, each cable 6 included seventeen input bus lines and ten output bus lines all of which are available to the several point modules 7 and 8, with the message frames 4 providing for selection of particular point modules 7 – 8 and further for selecting particular pieces of equipment 9 – 9a within such point modules. In particular, each point module 7 may be provided with a six bit binary address and the cable 6 is provided with corresponding common bus lines connected and shown as input lines 14 through 19, inclusive. Lines 14 – 19 are connected to a point module address decoder circuit 20. Each of the input cable lines is buffered by a suitable logic signal inverter 21 having an inverting input and provides a correspondingly related binary logic signal which is compared with a preset address signal. This, in the illustrated embodiment of the invention, the unique binary address is established at the point module 7 through a bank of switches 22 which selectively interconnect a positive supply 23 or a logic ground 24 as a preset input.

Thus each of the switches 22 is illustrated as a single-pole, double-throw switch having a common contact pole 25 selectively positioned to engage a set of normally open contacts 26 or a set of normally closed contacts 27. Normally, open contacts 26 connect the positive supply 23 as the input on a preset line 28 as a logic 1. The normally closed position contacts 27 connect the logic ground 24 to the related preset line 28 and provide a logic 0 input. The input at preset line 28 is compared with a message module code input which is transmitted via the inverter 21 to a line 29. Lines 28 and 29 are connected as related inputs to a comparator network 30 – 31. Thus in the illustrated embodiment of the invention, a pair of similar logic switching circuits 30 and 31 such as solid state switch units Ser. No. SN7,485 are shown, each unit being adapted to compare up to four pairs of inputs. The circuits 30 aNd 31 are interconnected via a coupling line 32 such that the six message frame inputs appearing at lines 14 through 19 must be in the same logic relationship as the set input at the several lines 28 in order to provide a positive output from the comparator network 30 and 31 which is connected via a lead 33 to a latch means 34. The latch circuit 34 is shown as a D-type flip-flop Ser. No. SN7,474. The address comparator signal is strobed into the latch circuit 34 only when a point module address available signal is transmitted from the frame handling logic unit 5 by the cable 6 to an input cable line 35. The message frame 4 thus requires parity checking and the like to restrict circuit functioning to properly introduce data. Line 35 is coupled through a buffer inverter 36 to the clock input of the illustrated flip-flop circuit 34. Once strobed into the circuit 34, an output enable line 37 rises to a logic 1 or high level and remains at the elevated level during the communication period in order to allow the remainder of the data carried by the message frame 4 to be strobed into the point module 7 or, conversely, if communication is to be in the opposite direction to permit transmission of the information from the point module 7 into the message frame.

The message frame 4 further includes a multiple bit command signal in binary form which, in the illustrated embodiment of the invention, is a four bit command code applied to a command latch circuit 38, which is conditioned for operation by the point module enable signal appearing at line 37. The command latch circuit 38 basically includes four latch circuits 39, shown as D-type flip-flops one for each of the command binary bits. Each is connected to one of the common bus lines shown as lines 15 through 18, using the common buffering inverter 21. The four bit command code is assembled on the input bus lines 15 – 18 by the unit 5, after which the frame handling unit 5 generates a control available signal at a common bus line 40 of cable 6. Bus line 40 is connected via a buffering inverter 41 to conjointly control the command circuit 38 with the point module enable signal appearing at line 37 via a suitable AND logic circuit 42. The output of the AND circuit 42 is connected in common to the clock input of all four registers 39 via a common line 43 and simultaneously strobes the binary logic signals appearing at lines 15 through 18 into the respective registers 39. The output of the four registers 39 are coupled as individual inputs to a binary logic decoder 44, shown in block diagram as an Ser. No. SN7,442 unit which is a one-of-ten type decoder adapted to provide selected output at any one of ten terminals. In the illustrated embodiment of the invention, the decoder 44 generates three possible outputs appearing at individual lines identified as a stop line 45, a start line 46 and a read line 47. A signal appears at one of the lines 45 – 47 which are preconnected to determine the particular function which is to be established on a selected piece of equipment, as presently described.

In addition the output of the four registers 39 are coupled through an NAND circuit 48 to create a single input (initialize) to a two input logic circuit 49, shown as an AND gate. The opposite input of the gate 49 is connected directly to the read output 47 to generate a common control signal at a read or initiate operation interlock signal line 50.

The several signals appearing at lines 45 – 47 and 50 are connected to control a motor select circuit 51 which provides for selection of the particular piece of equipment 9–9a upon which the function or operation established by circuit 38 is to be fulfilled. The point module 7 as illustrated provides for control of four different pieces of equipment which the circuit to motor 9 is schematically shown while the other elements are shown in block diagram. In accordance with the coded programming system the message frame following the command signal may be provided with certain interlocking and status bits and then includes a plurality of data bits. The motor or other hardware is selected to respond to the command in the illustrated embodiment of the invention by assigning each of the loads 9 – 9a to a unique data bit, with the four data bits assembled with frame unit 5 and applied via the cable 6 to circuit 51. In the illustrated embodiment of the invention, the first two data bits are introduced into the circuit via common bus lines 52 and 53 of cable 6 with the next two bits being inserted into the circuit through the previously used bus lines 14 and 15. The bus lines 52 and 53 are connected to the register circuit 55 by individual buffering inverters 54 while the several bus lines 14 and 15 are connected to the register circuit 55, employing the common buffer inverters 21.

The binary logic selection signals appearing at the input side of the register circuit 55 are transferred to four output lines 56 and 57, in response to the conjoint control of the signal from the point module enable line 37, the read or initiate signal line 50 and a third data available signal generated within and transmitted from the frame handling circuit 5 via a common bus line 58, which is also connected by a buffer inverter 58a.

Once the point selection data information has been assembled on the bus lines, the frame handling logic circuit 7 generates the signal at the data available line 58 via the inverter 58a. An AND gate 59 combines the signal at line 58 with that at line 37 and that output is combined with the signal at line 50 by a second AND gate 60. The output of gate 60 simultaneously clocks the unit 55 to create the point select data at lines 56 and 57 and pulses an integrated circuit unit 61 shown as an Ser. No. SN4,121 unit, to create an output pulse signal at a selected width, such as 500 milliseconds. Thus, unit 61 is shown connected to a positive logic supply through a timing circuit, consisting of capacitor 62 and resistor 63. This generates a signal at the not output with the delay which is selected to allow sufficient time for the motor contactor circuit to be latched in. The delay output signal is NORed with the start-stop signals through a pair of NOR gates 64 and 65. One corresponding input of each of the gates 64 and 65 is connected in common to the output of the gate 61. The second inputs of the respective gates 64 and 65 are individually connected to respond to the output of the command signal lines 45 and 46, through a latch circuit 66 which is set by the corresponding command input signal lines 45 and 46. The illustrated latch circuit 66 is an R-S flip-flop circuit having a pair of interconnected NAND gates with inverting inputs connected respectively to the command signal lines 45 and 46 to generate related outputs at a stop signal line 67 connected to the NOR gate 64 and a start signal line 68 connected to the corresponding input of the NOR gate 65.

Thus, after all of the inputs have been introduced into the point module the enable and initiating signals are combined to simultaneously enable gates 64 and 65, which select the signal appearing at line 67 or 68 and produce related signals at lines 69 and 70 which are applied with the selection signal at data signal line 56 to relay unit 13.

The illustrated relay unit 13 includes a pair of two input NAND gates 71 and 72. The output of gate 71 is connected to control a start relay 73 and gate 72 is connected to control a stop relay 74. The gates 71 and 72 have a corresponding input connected in common to the line 56 which is activated by the message frame unit to indicate that the particular unit has been selected for functioning. The second input of gates 71 and 72 are connected respectively to lines 69 and 70 such that one of the relays 73 and 74 is energized.

Relays 73 and 74 are similarly constructed. Each relay is a Form A relay with a winding 75 connected to a suitable logic voltage 84, such as five volts. When either relay is energized the associated contacts 73-1 and 74-1 close for the timing period established by circuit 61, for example, 500 milliseconds and complete a circuit to an isolated 15 volts operating supply 76. If relay 73 is energized, a current path is created through the now closed contacts 73-1 to the start terminal 11 and completes the circuit to an isolated common terminal of the isolated fifteen volt operating supply 76 for operation of a motor start relay unit 76a. Relay 74 similarly completes the return path for stop terminal 12. The Form A relay unit 13 isolates the logic circuitry from the electrical disturbances associated with the motor field or any other electrical equipment being controlled.

The system is reset through a common reset bus line 77 which is particularly applied to the address decoding circuit 20 and the common latch circuit 38 to reset the logic circuitry. Thus, referring to the address decoding circuit 20, the reset line 77 is connected through inverter units 78 to a clear terminal 79 on the register 34. Similarly, the illustrated clear terminals 80 of the registers 39 of the command latch and decoding circuit 38 are connected to the reset line 77 through inverting buffer 81. A positive acknowledgment signal must be transmitted from and to the remote station 3 to clear the module. Until such signal is obtained, the circuit is held in an activated position. When received, the registers 34 and 39 reset, and the enable line 37 and select lines 45, 46 and 50 return to the normal standby position.

In addition, the status of the motor control is indicated by the generating of a status signal at the operation of the motor unit and applying such status signal to a status sensing register 82.

In the illustrated embodiment of the invention, a set of motor contacts 76a-1 of relay unit 76a are connected into circuit to the isolated positive fifteen volt supply in series with the winding of a sensing contact relay 83 which, in turn, actuates a set of contacts 83-1 connected between a digital logic voltage supply 84 in series with a resistor 85 and a common digital ground 86. The junction of the resistor 85 and the contacts 83-1 constitutes a signal point which is interconnected by a signal line 87a into the register 82, into a compare circuit 87 such as an exclusive-OR and is interconnected into a bus line 88 for transmittal of the status sensed to the message system. The small relay 83 maintains the field isolation of the circuitry. The output of register 82 is compared to the contact status by the compare circuit 87 and connected to operate an interrupt latch 89. If the two are not in the same state, an interrupt is generated notifying the loop controller 1 that a status change has taken place. The actual addressing and transmittal of status information can be similar to that described in the copending application of Strojny et al. entitled "STATUS SENSING AND TRANSMITTING CIRCUIT" Ser. No. 315,573, which was filed on the same day as this application and is assigned to the same assignee. Thus, a feedback circuit may be of any suitable construction and is used to continuously monitor the status of the contacts corresponding to the associated device. This status can, of course, be checked by inquiry from the loop controller or as the result of the contacts circuit generating a message frame request whereby the loop controller will generate a request signal to the loop controller or to the remote station with the command signal operable to establish an output signal at lines 47 and 50 of circuit 38 thereby commanding the transmittal of the status information.

The present invention has been found to provide a reliable and simplified operating control and point monitoring system for a dual state device and which is particularly adapted to an efficient utilization of the circuit and hardware in a motor control and status detection system for an automated environmental control system. The system through the coded system permits a single address system, with selected controlled actuation or monitoring of the several equipment points or pieces in sequence or simultaneously.

As previously described the point modules may be constructed to produce a control of a multiplicity of similar load means with the point module in the form of a printed circuit board with the output line for connection to the control units 10 and the like. In some applications, greater efficiency may result from combining a plurality of different functions on a single circuit board. As diagrammatically shown in FIG. 2, a single board 90 may include a single command processing circuit such as shown in FIG. 1 but with the output of decoder 44 establishing additional control outputs and the coupling circuit 55 providing selective coupling to other load means than on-off type load means. Thus, one block 91 may provide a relay system such as shown in FIG. 1, while another block 92 may provide for sensing of contacts in another device and other blocks 93 may provide for detecting and readout of analog information from a corresponding plurality of load means.

Various modes of carrying out the invention are contemplated as being within the scope of the following claims, particularly pointing out and disctinctly claiming the subject matter which is regarded as the invention.

I claim:

1. In an automated communication system wherein a message frame is circulated through a communication loop for selective coupling to any one of a plurality of remote stations having frame handling means and point modules, at least one of said stations having a point module for controlling a multiple load means, the improvement wherein said point module includes an address decoding means coupled through a common bus means to said frame handling means and having a comparator producing an output signal in response to a selected comparison of the incoming message frame with a selected coded address, a latch means connected to the decoding means and establishing a latched point module enable signal in response to the output of said comparator, a command latch and decoding means connected to said common bus means and connected to the latch means and set to establish one of a plurality of operational output means, selection means connected by said common bus means to said frame handling means and operative to enable selectively corresponding load means of said point module, and a power isolating circuit means connected to said load means and conjointly responsive to the signal of the point selection means and command latch and decoding means and operable to establish the selected operating state.

2. The automated communication system of claim 1 wherein said address decoding means includes a point module address available signal line responsive to a signal on common bus means to control establishing of said latch means, said command latch and decoding means including a command available signal means responsive to the output of said latch means and a common available signal on the common bus means, and said load means selection means including a selection available signal means responsive to the output of said latch means and said command latch and decoding means and a selection available signal on the common bus means to activate a pulse circuit means for generating the power isolating circuit means.

3. In the automated communication system of claim 1 wherein said message frame includes a plurality of binary coded bits circulated through the communication loop wherein said address decoding circuit includes a point module available signal line coupled to said frame handling circuit indicating proper insertion of the address data, said command latch and decoding means includes a plurality of registers coupled through common bus lines to said frame handling means and receiving a binary code related to any one of a plurality of fixed operations, said registers having an activating input means connected and responsive conjointly to said point module enable signal and a command enable signal generated by the frame handling means indicating proper insertion of the command data code to said registers, a decoding means connected in common to the output of said registers and selectively establishing outputs related respectively to the first and second operating status of the load means, an initiate signal means interconnected to the output of said registers to produce a common interlock signal, and means connecting said point enable signal and said interlock signal to conjointly control said power isolating circuit means.

4. The communication system of claim 1 wherein said isolation means includes a plurality of individual binary input means connected respectively via common bus lines to said frame handling means, each of said lines being related to a particular equipment means and each of said lines receiving a binary signal in accordance with the selection or non-selection of the corresponding equipment, coupling circuit means connected between said input means and output selection lines connected respectively to said several load means, interlocking logic control means responsive to the address decoding means and command latch and decoding means and the input means of the selection means for simultaneously transferring the signal on the input means to the coupling circuit means and operating said pulse circuit means.

5. The communication system of claim 1 wherein said isolating circuit means includes individual relay means connected for alternately establishing either of two states of operation of the load means, each of said relay means including a combining circuit conjointly responsive to the signal of the selection means and of the pulse circuit means and operable to provide a timed relay energization to actuate a set of isolating control contacts connected to a load means control.

6. The communication system of claim 5 having means for monitoring the operational status of the load means, wherein a condition sensing relay includes a winding connected in series with said status contacts and having a set of low current status contacts, said status contacts being connected to a low voltage logic supply in series with a voltage dropping resistor, the connection of the resistor and the contact sensing contacts providing a logic signal, said command latch and decoding means including a read output means, means to store said logic signal and selectively transfer said signal to said common bus lines for loop communication in response to said read output means.

7. The automated communication system of claim 1 having means for monitoring the operational status of the load means, wherein said power isolating circuit means includes a separate power contact connecting the load to an operational power source, condition sensing means connected in circuit with said power contacts and having separate status indicating means, said status means providing a logic signal, said command latch and decoding means including a read output means, means to store said logic signal and selectively transfer said signal to said common bus lines for loop communication in response to said read output means.

8. The automated communication system of claim 1 wherein said command latch and decoding means including a plurality of registers coupled through common bus lines of said bus means to said frame handling means and receiving a binary code related to any one of a plurality of fixed operations including a first state establishing operation, a second state establishing oeration and a status read operation, said registers having an activating input means connected responsive conjointly to said address decoding means and a command enable signal generated by the frame handling means indicating proper insertion of the command data code to said registers, a decoding means connected in common to the output of said registers and selectively establishing one of three outputs related respectively to the first establishing state, the second state establishing state and a third read state.

9. The automated communication system of claim 8 including a common read or initiate logic means interconnected to the output of each of said registers and the read state output means of the command means to produce a common interlock signal for operation of the selection means.

10. In the system of claim 1, wherein the address decoding circuit includes a plurality of switch means selectively interconnecting and a multiple input binary comparator having a pair of inputs for each address position, one of said pair of inputs being connected by a single pole by a switch means to positive logic signal source or to logic ground, the other of said comparator inputs for each position being connected to a common bus line to receive the corresponding binary logic signal, said comparator comparing the multiple input address and establishing an output signal upon identical inputs at each address pair, a flip-flop circuit having a first input connected to the output of the comparator and having a clock input connected to the common bus line for receiving the point module address available signal for selective setting of said register and establishing of said output signal for enabling of the point module for intercommunication or receipt and transmission with respect to the message frame, said register having a clear terminal input means connected to a common bus line and reset in response only to a specific command signal transmitted by the frame handling means to said reset common bus lines.

11. In an automated communication system wherein a multiple bit control message frame is circulated through a communication loop for selective coupling to any one of a plurality of remote stations having a message frame handling means and point modules, at least one of said stations having one point module for controlling a plurality of load means in combination with means for monitoring the status of at least selected load means each remote station having a common bus cable connecting the point modules in common to said frame handling means, the improvement wherein said one point module includes a multiple bit address decoding circuit including a binary decoder comparator including a plurality of set inputs defining a unique point address and a plurality of frame inputs coupled through a plurality of common bus lines to said frame handling means, a latch circuit connected to the output of said comparator for establishing a latched point module enable signal line in response to the output of said comparator said address decoding circuit including a point module available signal line coupled to said frame handling means to activate said latch circuit in response to a signal from the frame handling means indicating proper insertion of the address data on said comparator means, a command latch and decoding circuit including a plurality of second latch circuits coupled through said common bus lines to said frame handling means and receiving a binary code related to any one of a plurality of fixed operations including a first state establishing operation, a second state establishing operation and a status read operation, said second latch circuits having an activating input means connected and responsive conjointly to said point module enable signal line and a command enable signal generated by the frame handling means indicating proper insertion of the command data code to said latch circuits, a decoding means connected in common to the output of said second latch circuits and selectively establishing one of three output means related respectively to the first establishing state and the second state establishing state and the third read state, a common read or initiate signal means interconnected to the output of each of said second latch circuits and the read state output means to produce a common interlock signal, said point modules further including a load selection means having a plurality of individual binary selection input means connected respectively via common bus lines to said frame handling means, each of said lines being related to a particular load means and each of said lines receiving a binary selection signal in accordance with the selection or non-selection of the corresponding equipment and connected to enable a corresponding load means for operation, interlocking control means including first logic means for combining the point module enable signal, the common command signal of the command latch and decoding circuit and a data available signal generated by the frame handling means and creating first and second operational signals to actuate the load means conjointly with the binary selection signals to place the load means in the selected operational state.

12. The communication system of claim 11 having a power isolating relay circuit connected between said control means and the load means and having individual relay means connected for alternately establishing said two states, each of said relay means including a combining circuit conjointly responsive to the operational signals and the selection signal and operable to provide timed energization of a corresponding relay winding to actuate a set of separate isolating control contacts connected to the load means.

13. The communication system of claim 12 having a status sensing relay means including a winding connected in series with said control contacts and having a set of status contacts, said status contacts being connected to a low voltage logic supply in series with a voltage dropping resistor, the connection of the resistor and the contact sensing contacts providing a logic signal, means to store said logic signal and responsive to the read state output of said command latch and decoding circuit to transfer said signal to said common bus lines for loop communication.

14. In the system of claim 11 wherein the point module address decoding circuit includes a plurality of switch means selectively interconnecting and a multiple input binary comparator having a pair of inputs for each address position, one of said pair of inputs being connected by a switch means to a positive logic signal source or to logic ground, the other of said comparator inputs for each position being connected to a different common bus line to receive the corresponding binary logic signal, said comparator comparing the multiple input address and establishing an output signal upon identical inputs at each address pair, a latch circuit having a first input connected to the output of the comparator and having a clock input connected to the common bus line for receiving the point module address available signal for selective setting of said latch circuit and establishing of said enable signal for enabling of the point module for intercommunication or receipt and transmission with respect to the message frame, said latch circuit having a clear terminal input means connected to a common bus line and reset in response only to a specific command signal transmitted by the frame handling means to said reset common bus line.

15. In the communication system of claim 11 wherein the command latch and decoding circuit includes a plurality of individual binary signal registers each having a corresponding input connected to a selected common bus line, each of said registers having a clock input means, a logic gate having an output connected to said clock terminals in common and having a first input connected to the point module enable signal line and a second input connected to a common bus line for receipt of the command available signal from the frame handling means, said registers each having a clear signal input means connected in common to a common reset bus line, a multiple input decoder having each of the inputs connected to the output of a corresponding register and having individual outputs including one for each of said three outputs, and a logic circuit means connected to the outputs of all registers and to the read output of the multiple input decoder and providing a common interlock signal output for selectively and conjointly with said individual outputs enabling the point selection means and load means.

16. The communication system of claim 15 wherein said logic circuits means includes a first logic gate connected to the output of the registers to establish an output in response to an output from anyone of such registers, and a second logic gate connected to the first logic gate and the read output to create a read or initiate interlock output.

17. In the communication system of claim 11 wherein the selection means includes a clocked coupling circuit having an individual input for each load means for receiving the corresponding binary signal from the frame handling means, said coupling means having a clock input, a combining logic gate means having three inputs connected respectively to a bus line for receiving a data available signal from said frame handling means and a second input connected to the point module latch circuit to receive the enable signal and a third input connected to the command means and establishing an output signal in response to simultaneous receipt of the corresponding inputs, said logic gate means being connected to actuate said coupling circuit to transmit the information to load lines, and timed means to actuate the load means in accordance with the output of the logic gate means and the output of the command latch and decoding circuit.

18. The communication system of claim 17 wherein said timed means includes a timing means connected to the output of the logic gate means and establishing a precise timed pulse, second logic means connected to the timing means and the command circuit means and providing a pair of related timed output signals, a pair of output logic gate means having connected one each to the second logic means and in common to the output of the road lines.

19. In the communication system of claim 11 wherein the selection means includes a clocked coupling circuit having an individual input for each load means for receiving the corresponding binary signal from the frame handling means, said coupling means having a clock input, a combining logic gate means having three inputs connected respectively to a bus line for receiving a data available signal from said frame handling means and a second input connected to the point module latch circuit to receive the enable signal and a third input connected to the command means and establishing an output signal in response to simultaneous receipt of the corresponding inputs, said logic gate means being connected to actuate said coupling circuit to transmit the information to load lines, a solid state amplifier having a timing means connected to the output of the logic gate means and establishing a precise timed pulse, a flip-flop means having a pair of inputs connected to the operation command signal means of the decoding circuit of the command circuit means and providing related output signals, a pair of logic gate means having a first input connected in common to the output of the amplifier and having the second inputs connected respectively to the outputs of the command flip-flop, a pair of relay units for each load means having a pair of two input NAND logic gates, the first input of both NAND gates being connected in common to the corresponding load line from the coupling circuit and the second input being connected respectively to the logic gate means providing pulsed input signals in accordance with the pulse signal from the amplifier, each of said relay units having a winding connected by the NAND gate to a logic supply and a set of normally open contacts connected from an isolated operating voltage to an isolated common line, pulsed operation of such normally open contacts being operable to actuate said load means.

20. The communication system of claim 19 having a contact sensing relay including a winding connected in series with motor status contacts and a set of sensing contacts, a logic power supply, a sensing means connected to the logic power supply in series with said sensing contacts, and a contact sensing register means connected to said sensing means to record the operation of the motor and maintain a contact status output signal in said register.

\* \* \* \* \*

UNITED STATES PATENT OFFICE
CERTIFICATE OF CORRECTION

Patent No. 3,796,995          Dated March 12, 1974

Inventor(s) Lawrence J. Strojny

It is certified that error appears in the above-identified patent and that said Letters Patent are hereby corrected as shown below:

Column 1, line 64, Cancel "is" and substitute therefor ---in---, column 5, line 17, cancel "aNd" and substitute therefor ---and---, column 6, line 59, cancel "Ser. No. SN4,121" and substitute therefor ---Ser. No. SN74,121---, column 9, line 45, cancel "generat-" and substitute therefor ---operat----, column 10, line 61, cancel "bera-" and substitute therefor ---oper---- column 11, line 16, after "to" insert ---a---, line 53, after "parator" and before "said" insert ---,--- (a comma), column 13, line 27, cancel "circuits" and substitute therefor ---circuit---, column 14, line 6, cancel "road" and substitute therefor ---load---

Signed and sealed this 15th day of October 1974.

(SEAL)
Attest:

McCOY M. GIBSON JR.          C. MARSHALL DANN
Attesting Officer          Commissioner of Patents